United States Patent
Iwamoto et al.

(10) Patent No.: US 7,153,808 B2
(45) Date of Patent: Dec. 26, 2006

(54) ULTRAVIOLET AND VISIBLE-LIGHT-SENSITIVE TITANIA-BASED PHOTOCATALYST

(75) Inventors: Shinji Iwamoto, Kyoto (JP); Masashi Inoue, Kyoto (JP); Hirotaka Ozaki, Kyoto (JP)

(73) Assignee: Kyoto University, Kyoto (JP)

( * ) Notice: Subject to any disclaimer, the term of this patent is extended or adjusted under 35 U.S.C. 154(b) by 78 days.

(21) Appl. No.: 11/087,175

(22) Filed: Mar. 24, 2005

(65) Prior Publication Data

US 2006/0009351 A1 Jan. 12, 2006

(30) Foreign Application Priority Data

Jul. 7, 2004 (JP) ............... 2004-200959

(51) Int. Cl.
 *B01J 27/24* (2006.01)
 *B01J 21/00* (2006.01)
 *B01J 23/00* (2006.01)

(52) U.S. Cl. ............... 502/200; 502/242; 502/350
(58) Field of Classification Search ............... 502/200, 502/242, 350
See application file for complete search history.

(56) References Cited

U.S. PATENT DOCUMENTS 6,077,492 A * 6/2000 Anpo et al. ............... 423/239.1

FOREIGN PATENT DOCUMENTS

| JP | 6-182205 | 7/1994 | |
| JP | 06-329443 | * | 11/1994 |
| JP | 06-345490 | * | 12/1994 |
| JP | 9-192496 | | 7/1997 |
| JP | 10-121266 | | 5/1998 |
| JP | 11-33408 | | 2/1999 |
| JP | 2000-254493 | | 9/2000 |
| JP | 2000-254494 | | 9/2000 |
| JP | 2002-346382 | | 12/2002 |
| JP | 2003-200057 | | 7/2003 |
| JP | 2003-275600 | | 9/2003 |
| JP | 2003-340288 | | 12/2003 |
| JP | 3498739 | | 12/2003 |
| JP | 1-2003-200057 | | 6/2005 |
| WO | WO96/29375 | | 9/1996 |
| WO | WO 01/10552 A1 | | 2/2001 |

OTHER PUBLICATIONS

*Thermal Stability of Silica-Modified Titanias Prepared by the Glycothermal Method*, Sihinji Iwanmoto, et al., CIMTEC 2002—10$^{th}$ International Ceramics Congress and 3$^{rd}$ Forum on New Materials, P. Vincenzini, Editor, Techna Srl, 2003, pp. 77-84.1.

(Continued)

Primary Examiner—J. A. Lorengo
Assistant Examiner—Patricia L. Hailey
(74) Attorney, Agent, or Firm—Kirschstein, et al.

(57) ABSTRACT

The present invention provides photocatalysts showing excellent sensitivity not only in ultraviolet light region but also in visible light region. The ultraviolet and visible light-sensitive titania-based photocatalysts according to the present invention are characterized by their composition as expressed by a general formula: $TiSi_xN_yO_{2+2x-y}$ (where $0.01<x<1$ and $0.003<y<0.3$). The invented photocatalysts have optical properties that the relative absorbance at 450 nm to that of 300 nm is not lower than 0.1 and the relative absorbance at 600 nm to that of 300 nm is not higher than 0.1.

4 Claims, 9 Drawing Sheets

OTHER PUBLICATIONS

*Thermal Stability of Silica-Modified Titania Ultrafine Particles Synthesized by the Glycothermal Method*, Sihinji Iwanmoto, et al., Innovative Processing/Synthesis: Ceramics, Glasses, Composites IV, pp. 643-654.

*Xanes and XPS Study of Silica-Modified Titanias Prepared by the Glycothermal Method*, Sihinji Iwanmoto, et al., Chem. Mater. 2005, 17, pp. 650-655.

Synthesis of Large-Surface Area Silica-Modified Titania Ultrafine Particles by the Glycothermal Method, Sihinji Iwanmoto, et al., *Journal of Materials Science Letters 19*, 2000, pp. 1439-1443.

*Preparation of the Xerogels of Nanocrystalline Titanias by the Removal of the Glycol at the Reaction Temperature After the Glycothermal Method and Their Enhanced Photocatalytic Activities*, Sihinji Iwanmoto, et al., 2001 American Chemical Society, pp. 417-421.

*Method of Photocatalytically Making the Surface of Base Material Ultrahydrophilic, Base Material Having Ultrahydrophilic and Photocatalytic Surface, and Process of Producing Said Material*, http://v3.espacenet.com/textclam, Jun. 7, 2005, pp. 1-18.

English translation of Japanese Publiction No. H09-192496, file:// c:YDocuments and SettingsYuserYMy DocumentsYJPOEnYjp-A-H09I, Jun. 7, 2005, pp. 1-6.

*Photocatalytic Material, Photocatalytic Article and Method Their Preparation*, http://v3.espacenet.com/textclai?DB=Ep0D0C&IDX=WO0110552&F=O&Q ..., Jun. 7, 2005, pp. 1-3.

*Preparation, Testing and Characterization of Doped $TiO_2$ Active in the Peroxidation of Biomolecules Under Visible Light*, Revathi Bacsa, et al., J. Phys. Chem. B 2005, 109, pp. 5994-6003, Mar. 4, 2005.

*Deep-Level Optical Spectroscopy Investigation of N-Doped $TiO_2$ Films*, Yoshita Nakano, et al., Applied Physics Letters 86, 132104 (pp. 1-3) (2005).

*Synthesis of Excellent Visible-Light Responsieve $TiO_2$—$_xN_y$Photocatalyst by a Homogeneous Precipitation-Solvothermal Process*, sHU yin, et al., j. mater. chem., 2005, 15, pp. 674-682.

*Vicible-Light Sensitization of $TiO_2$ Photocatalysts by Wet-Method N Doping*, Shinri Sato, et al., Applied Catalysis A: General 284 (2005) pp. 131-137.

*Oxidative Power of Nitrogen-Doped $TIO_2$ Photocatalysts Under Visible Illumination*, Marta Mrowetz, et al., vol. 108, No. 45, Nov. 11, 2004, pp. 17269-17273.

*Visible-Light-Driven Nitrogen0Dioed $TiO_2$ Photocatalysts: Effect of Nitrogen Precursors on Their Photocatalysis for Decomposition of Gas-Phase Organic Pollutants*, Di Ll, et al., Materials Science and Engineering B 117 (2005) pp. 67-75.

*Photoelectron Spectroscopic Investigation of Nitrogen-Doped Titania Nanoparticles*, Xiaobo Chen, et al., J. Phys. Chem B 2004, 108, pp. 15446-15449.

*Preparation of Nitrogen-Doped Titanium Oxide Thin Film Using a PLD Method as Parameters of Target Material and Nitrogen Concentration Ratio in Nitrogen/Oxygen Gas Mixture*, Yoshiaki Suda, et al., Thin Solid Films 475 (2005) pp. 337-341.

*Visible-Light Active N-Doped $TiO_2$ Prepared by Heating of Titanium Hydroxide and Urea*, K. Kobayakawa, et al., Journal of Photochemistry and Photobiology A: Chemistry 170 (2005) pp. 177-179.

*Nitrogen-Doped Titanium Oxide Films as Visible Light Photocatalyst by Vapor Deposition*, Min-Chi Yang, et al., Thin Solid Films 469-470 (2004) pp. 1-5.

Visible Light Activity and Photoelectrochemical Properties of Nitrogen-Doped $TiO_2$, S. Sakthivel, et al., J. Phys. Chem B 2004, 108, pp. 19384-19387.

*Development of Suger-Hydrophilicity on Nitrogen-Doped $TiO_2$ Thin Film Surface by Photoelectrochemical Method Under Visible Light*, J. Premkumar, Chem. Mater. 2004, 16, pp. 3980-3981.

*Phase-Compositional Control and Visible Light Photocatalytic Activity of Nitrogen-Doped Titania Via Solvothermal Process*, Journal of Solid State Chemistry, Y. Aita, et al., 177, 2004, pp. 3234-3238.

*(Sulfur, Nitrogen)-Codoped Rutile-Titanium Dioxide as a Visible-Light-Activated Photocatalyst*, J. Am. Ceram. Soc., Hongyan Liu, et al., 2004, pp. 1582-1584.

*Zeta Potential and Photocatalytic Activity of Nitrogen Doped $TiO_2$ Thin Films*Phys. Chem. Chem. Phys., m. miyauchi, et al., 2004, pp. 865-870.

*Mechanism for Visible Light Responses in Anodic Photocurrents at N-Doped $TiO_2$ Film Electrodes*, J. Phys. Chem. B, R. Naakamura, 2004, 108, pp. 10617-10620.

*Photochemical Activity of Nitrogen-Doped Rutile $TiO_2(110)$ In Visible Light*, J. Phys. Chem. B, O. Diwald, et al., 2004, 108, pp. 6004-6008.

*N-Doped $TiO_2$ Nanotube With Visible Light Activity*, Chemistry Letters vol. 33, No. 9, (2004), The Chemical Society of Japan, H. Tokudome, et al., pp. 1108-1109.

*Origin of the Different Photoactivity of N-Doped Anatase and Rutile $TiO_2$*, Physical Review B 70, C. DiValentin, et al., The American Physical Society, 2004, pp. 085116-1-085116-4.

*Investigation of Nitrogen Doped $TiO_2$ Photocatalytic Films Prepared by Reactive Magnetron Sputtering*, Catalysis Communications 5 2004, Song-Zhe Chen, et al., pp. 677-680.

*Photoelectrochemical Study of Nitrogen-Doped Titanium Dioxide for Water Oxidation*, J. Phys. Chem. B, 2004, 108, G. Romualdo Torres, et al., pp. 5995-6003.

*New Method to Prepare Nitrogen-Doped Titanium Dioxide and its Photocatalytic Activities Irradiated by Visible Light*, J. Am. Ceram. Soc., S. Yang, et al., 87 (9) 2004, pp. 1803-1805.

*The Effect of Nitrogen Ion Implantation of the Photoactivity of $TiO_2$*Rutile Single Crystals, J. Phys. Chem. B, O. Diwald, et al.2004, 108, pp. 52-57.

*Highly Efficient Formation of Visible Light Tunable $TiO_{2-x}O_xN_x$ Photocatalysts and Their Transformationat the Nanoscale*, J. Phys. Chem B, J. Gole, et al., 2004, 108, pp. 1230-1240.

*Preparation of High Quality Nitrogen Doped $TiO_2$ Thin Film As A Photocatalyst Using A Pulsed Laser Deposition Method*, Thin Solid Films, Y. Suda, et al., 2004, pp. 162-166.

*Preparation of Nitrogen Doped Titanium Dioxide by Using Guanidine and Its Characterization*, Journal of the Ceramic Society of Japan, Supplement 112-1, Pacrim5 Special Issue, M. Matsushita, et al., 112 (5) 2004, pp. S-1411-S1413.

*Photoelectrochemical and Optical Properties of Nitrogen Doped Titanium Dioxide Films Prepared by Reactive DC Magnetron Sputtering*, J. Phys. Chem B, T. Lindgren, et al., 2003, 107, pp. 5709-5716.

*Nitrogen-Concentration Dependence on Photocatalytic Activity Of $TiO_{2-x}N_x$ Powders*, J. Phys. Chem. B, H. Irie, et al., 2003, 107, pp. 5483-5486.

*Photocatalytic and Photoelectrochemical Properties of Nitrogen-Doped Titanium Dioxide*, Chemphyschem 2003, S. Sakthivel, et al., pp. 487-490.

*Preparation of Nitrogen-Doped Titania with High Visible Light Induced Photocatalytic Activity By Mechanochemical Reaction of Titania and Hexamethylenetetramine*, The Royal Society of Chemistry 2003, S. Yin, et al., 2003, 13, pp. 2996-3001.

*Visible-Light-Active Titanium Oxide Photocatalyst Realized by an Oxygen-Deficient Structure and by Nitrogen Doping*, Elsevier Science B.V., T. Ihara, et al., 2002, pp. 403-409.

*Visible-Light Photocatalysis in Nitrogen-Doped Titanium Oxides*, Science, vol. 293, R. Asahi, et al., vol. 293, Jul. 13, 2001, pp. 269-271.

*Photocatalytic Activity of $No_x$-Doped $TiO_2$ in the Visible Light Region*, Elsevier Science Publishers B.V., Chemical Physics Letters, S. Sato, vol. 123, No. 1, 2, Jan. 3, 1986, pp. 126-128.

\* cited by examiner

ULTRAVIOLET AND VISIBLE-LIGHT-SENSITIVE TITANIA-BASED PHOTOCATALYST

FIELD OF THE INVENTION

The present invention relates to titania photocatalysts which show excellent visible-light-sensitivity. The catalytic materials obtained in this invention can be widely used for various practical fields, such as air-cleaning, water-purification, self-cleaning, anti-fogging, disinfection, chemical synthesis, and hydrogen production via water decomposition. There are invented some significant advantages, in this invented material, of being safe, nontoxic, or inexpensive. With respect to the distinguished nature mentioned above, we can utilize this new material as coating substance of various equipments, appliances and utensils, which are used for glasses, mirrors, lightings, papers, or clothes, as well as construction materials.

DESCRIPTION OF THE RELATED ART

Titania (titanium oxide) is known as a semiconductor material which exhibits photocatalytic activity for decomposition of organic substances under ultraviolet (UV) light irradiation. A photocatalytic reaction generally includes the following processes: when photons have an energy higher than the semiconductor band gap, they are absorbed, and electrons in the valence band are promoted to the conduction band, leaving positive holes in the valence band. The excited electron is used to reduce substances, and the positive hole is used to oxidize substances on the surface of the catalyst. Now, photocatalytic reaction systems collect great attention because the systems necessitate only photons as the energy source, and the photoinduced chemical species have strong oxidation and reduction potential even at room temperature. Recently, in the field of chemical synthesis and decomposition of harmful organic substances in air or water, some systems came to be considered as practically useful processes.

A patent, WO96/29375, shows another property of titania photocatalysts, termed as 'photoinduced superhydrophilic property.' When a titania is coated on glasses and mirrors, the visibility degradation by droplets of water on them does not occur according to this property.

However, the band gap energy of titanias (anatase structure) is 3.2 eV, which corresponds to light in UV region (wave length<388 nm). Therefore, titanias show photocatalytic activity only by ultraviolet light irradiation. It is generally said that the solar light coming the earth's surface includes only about 3% of UV light. This means that a titania photocatalyst can use only about 3% of the solar energy.

To improve the optical property of the titania photocatalysts, several methods have been proposed, for examples, doping transition metals, such as chromium and iron, or nitrogen into titania photocatalysts. Disclosed patents, JP-H9-192496-A, WO01/010552 and JP-H15-200057-A, indicate that titania catalysts containing these elements have visible light sensitivity. They demonstrated that organic substances which may cause contamination and/or odor are decomposed by using indoor fluorescent lights. On the other hand, it is also known that the introduction of the alien elements to titanias promotes the recombination of electron and positive hole, and this resulted in the decrease in the efficiency of photocatalytic reactions. Although several types of visible-light-sensitive photocatalysts have been proposed hitherto, the mount of the doping elements are low in order to avoid the recombination of the electron-hole pairs, and consequently, the absorption efficiency for the light in visible region is not high. To improve the photocatalytic activity under visible light irradiation, a catalyst with a high absorption property at visible light region is strongly required.

SUMMARY OF THE INVENTION

The present invention provides photocatalytic materials showing excellent photocatalytic activity not only under ultraviolet light irradiation but also under visible light irradiation.

The UV and visible-light-sensitive titania photocatalysts described in the present invention have characteristic compositions expressed by a general formula: $TiSi_xN_yO_{2+2x-y}$ (where $0.01<x<1$ and $0.003<y<0.3$). The materials also have characteristic optical properties; the relative absorbance at 450 nm is not lower than 0.1, and the relative absorbance at 600 nm is not higher than 0.1. Here, the relative absorbances are defined as the following equations for 450 nm and 600 nm, respectively, based on the absorbance at 300 nm:

(Relative absorbance at 450 nm)=(Absorbance at 450 nm)/(Absorbance at 300 nm)

(Relative absorbance at 600 nm)=(Absorbance at 600 nm)/(Absorbance at 300 nm)

Figure 1:
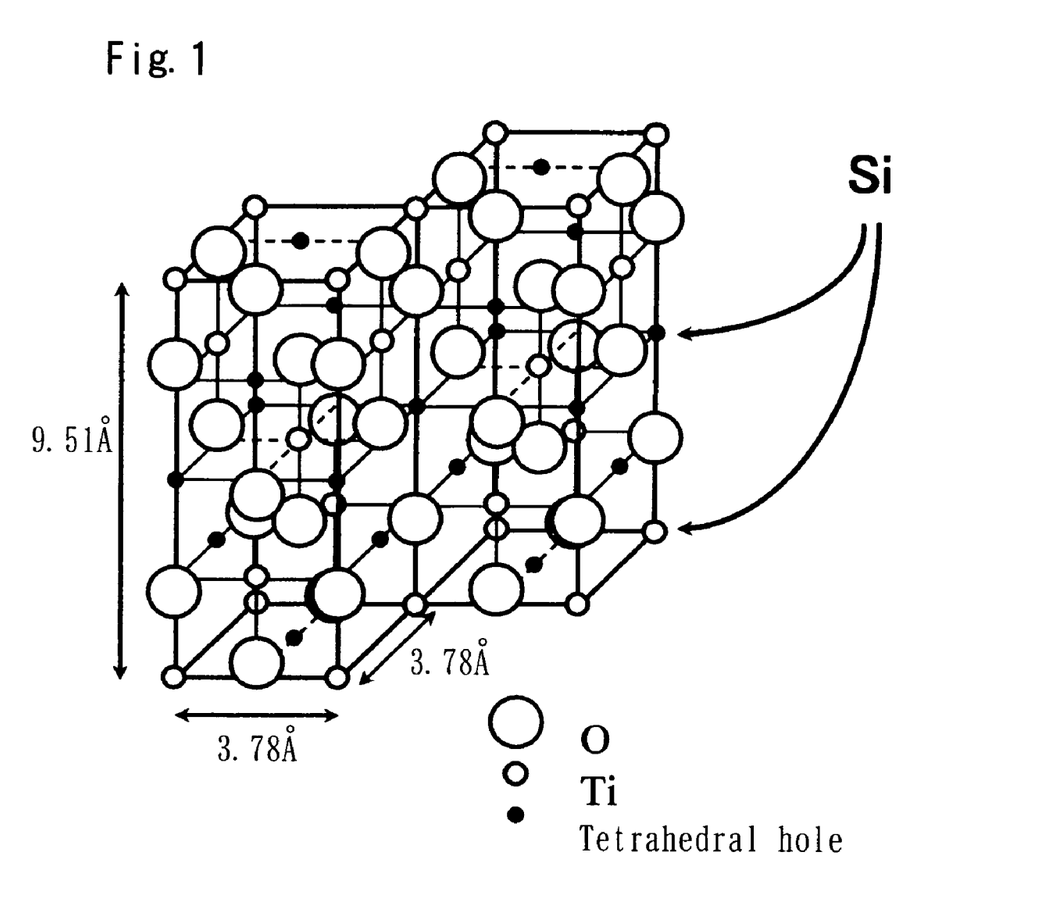
FIG. 1 shows structure of anatase.

In FIG. 1, the structure of titania of anatase structure is illustrated. In a normal titania of anatase structure, Ti atoms are located in octahedral sites shown as small open circles in FIG. 1. When a titania is modified with silica, the thermal stability of the material is improved significantly. In a silica-modified titania, Si atoms are inserted to the tetrahedral holes of the anatase structure or Si atoms substitutes Ti atoms located in the octahedral sites in the crystal structure. In the present invention, nitrogen atoms are introduced into the structure by $NH_3$ treatments at high temperatures. The thus-obtained materials are described as nitrogen-doped silica-modified titanias.

We have found that the nitrogen-doped silica-modified titanias exhibit photocatalytic activities higher than conventional titania-based photocatalysts under visible light irradiation. Among the various nitrogen-doped silca-modified titanias, superior photocatalytic activities are obtained using the materials that have the composition expressed as a general formula of $TiSi_xN_yO_{2+2x-y}$, where $0.03 \leq x \leq 0.3$ and $0.005 \leq y \leq 0.03$. These materials possess characteristic absorption spectra; the relative absorbance at 450 nm is not lower than 0.2, and the relative absorbance at 600 nm is not higher than 0.05.

The photocatalysts as mentioned above are prepared by introducing nitrogen to the silica-modified titanias by ammonia treatments at high temperatures. The values of x and y are properly adjusted by changing the ratio of the reactants used in the preparation of the silica-modified titania, and also by changing the conditions of the nitrogen doping, such as flow rate and concentration of the ammonia, heating temperature, and treatment period. Furthermore, the values of x and y are varied by heating the samples under oxidative atmosphere after the $NH_3$ treatment.

The photocatalysts in this invention shows an excellent visible-light-sensitivity compared to conventional visible-light-sensitive photocatalysts. Therefore, a wider region of the light, ranging from ultraviolet to visible or abundantly included in sunlight, is efficiently utilized. The thus-obtained nitrogen-doped silica-modified titanias are provided for various applications, such as decontamination, self-cleaning, deodorant, disinfection and antibacterial materials. Because they absorb a wide range of light efficiently, they may be utilized even indoor where light intensity is relatively weak.

DESCRIPTION OF THE PREFERRED EMBODIMENTS (Synthesis of Silica-Modified Titanias and Introduction of Nitrogen in the Silica-Modified Titanias)

25 g of tetraisopropyl titanate, 1.83 g of tetraethyl orthosilicate and 100 ml of 1,4-butanediol were mixed together (atomic ratio of the charged Si/Ti=0.1) and set in an autoclave. After the system inside was replaced by nitrogen, the mixture was heated from room temperature to 300° C. at a rate of 2.3° C./min. and held at 300° C. for 2 hours. While keeping the temperature at 300° C., the valve of the autoclave was slightly opened and the vapor phase in the autoclave was removed off. After cooling, a xerogel product was obtained. The product was calcined at 500° C. for 30 minutes in air to give a silica-modified titania. The silica-modified titania obtained is designated as XG(0.1). Silica-modified titanias with different Si/Ti ratios are prepared by changing the amounts of the Si and Ti sources, and the products are designated as XG(x) where x is the charged ratio of Si/Ti.

Collection of the silica-modified titania after heating in the autoclave was carried out in another way; after the heating as same as mentioned above, the assembly was cooled down to room temperature, to give the solid product suspended in the solvent. The solid product was collected by centrifugation, washed with methanol, and air-dried. The obtained product was calcined at 500° C. for 30 minutes. The silica-modified titanias thus-prepared is designated as GT(x) where x is the charged ratio of Si/Ti. Titanias without silica-modification, XG(0) and GT(0), were also prepared in the same way as mentioned above.

The preparation method mentioned above is same as the method described in a patent, JP-H12-254493-A. However, by other preparation methods, silica-modified titanias having similar properties as mentioned hereafter are obtained.

The silica-modified titania thus-prepared was set in a tube and contacted to an ammonia gas flow at a rate of 100 mL/min. The sample was heated at 450 to 700° C. for 30 min or longer. A preferred time of the treatment is from 30 min to 1 hour because a prolonged time of the $NH_3$-treatment results in the formation of TiN phase.

Figure 2:
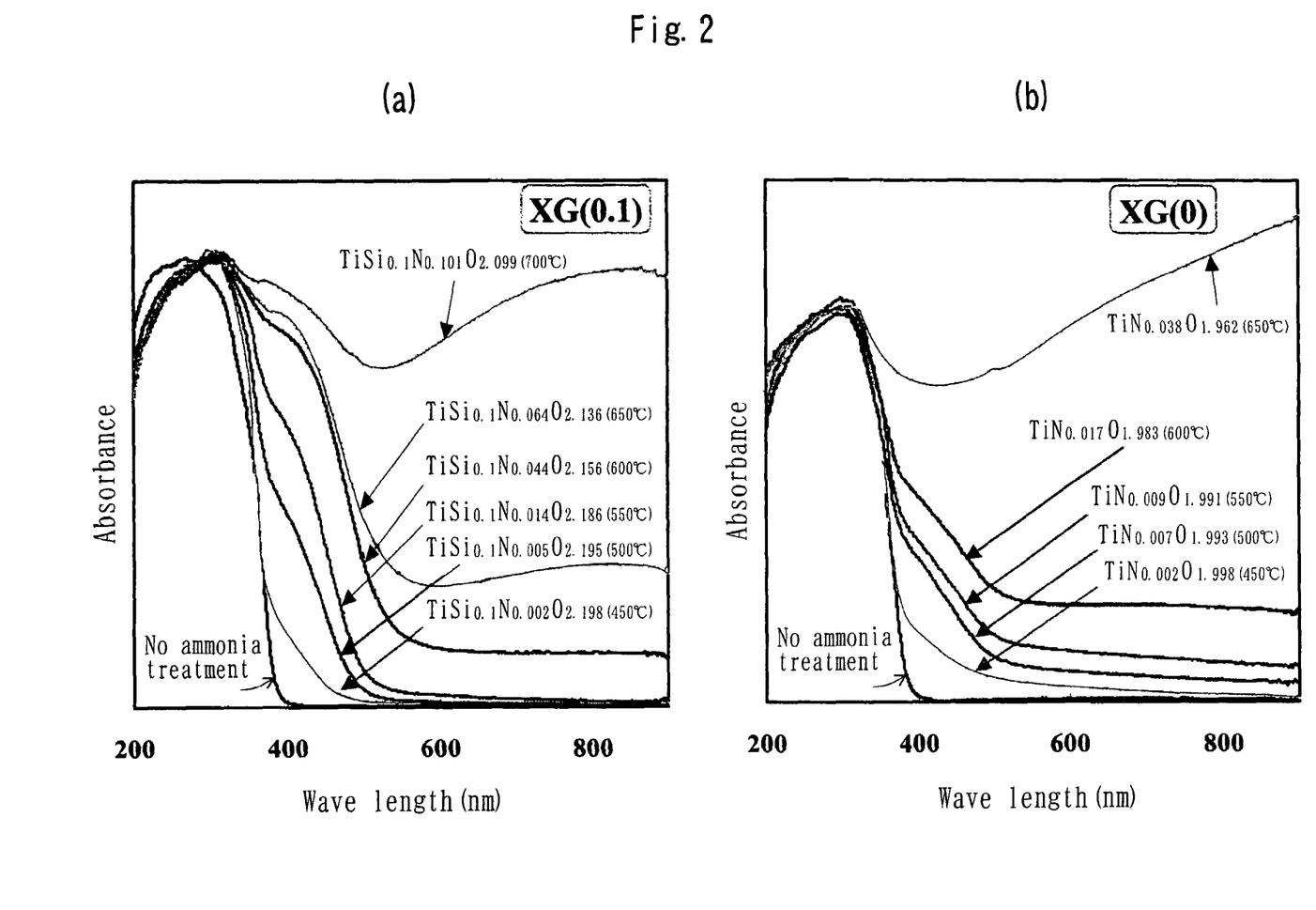
FIG. 2 shows UV-Vis absorption spectra of (a) silica-modified titania XG(0.1) and (b) titania XG(0) treated in $NH_3$ at high temperatures.

In FIG. 2, UV-Vis absorption spectra of the obtained photocatalysts are shown. FIG. 2(a) shows absorption spectra of the nitrogen-introduced silica-modified titania XG(0.1) and FIG. 2(b) shows those of XG(0). The temperature of the $NH_3$-treatment and the surface composition of the samples are also shown in the figure. XG(0.1) or XG(0) without $NH_3$-treatment exhibits an absorption only in the UV range (<400 nm). On the contrary, the $NH_3$-treated samples, both XG(0.1) and XG(0), showed absorption at visible light region. As the treatment temperature was higher, the absorption at visible light region became stronger. The amount of the nitrogen doped (y in $TiSi_xN_yO_{2+2x-y}$) also increased as increasing the temperature. The XG(0.1) samples have stronger absorption at a wave length ranging from 400 to 500 nm compared with the XG(0) samples.

The compositions measured by X-ray photoelectron spectroscopy (XPS) and the relative absorbances at 450 nm and 600 nm are shown in Tables 1 and 2, for XG(0.1) and XG(0), respectively.

TABLE 1

The surface composition and optical property of XG(0.1)

| Sample | Composition | x | y | Relative Absorbance at 450 nm | Relative Absorbance at 600 nm | $NH_3$ treating temperature (° C.) |
|---|---|---|---|---|---|---|
| XG(0.1) | $TiSi_{0.1}N_{0.002}O_{2.198}$ | 0.1 | 0.002 | 0.050 | 0.010 | 450 |
| | $TiSi_{0.1}N_{0.005}O_{2.195}$ | 0.1 | 0.005 | 0.205 | 0.011 | 500 |
| | $TiSi_{0.1}N_{0.014}O_{2.186}$ | 0.1 | 0.014 | 0.360 | 0.025 | 550 |
| | $TiSi_{0.1}N_{0.044}O_{2.156}$ | 0.1 | 0.044 | 0.666 | 0.130 | 600 |
| | $TiSi_{0.1}N_{0.064}O_{2.136}$ | 0.1 | 0.064 | 0.697 | 0.263 | 650 |
| | $TiSi_{0.1}N_{0.101}O_{2.099}$ | 0.1 | 0.101 | 0.856 | 0.817 | 700 |

TABLE 2

The surface composition and optical property of XG(0)

| Sample | Composition | x | y | Relative Absorbance at 450 nm | Relative Absorbance at 600 nm | $NH_3$ treating temperature (° C.) |
|---|---|---|---|---|---|---|
| XG(0) | $TiN_{0.002}O_{1.998}$ | 0 | 0.002 | 0.097 | 0.038 | 450 |
|  | $TiN_{0.007}O_{1.993}$ | 0 | 0.007 | 0.228 | 0.081 | 500 |
|  | $TiN_{0.009}O_{1.991}$ | 0 | 0.009 | 0.273 | 0.127 | 550 |
|  | $TiN_{0.017}O_{1.983}$ | 0 | 0.017 | 0.406 | 0.247 | 600 |
|  | $TiN_{0.038}O_{1.962}$ | 0 | 0.038 | 0.810 | 0.958 | 650 |
|  | $TiN_{0.184}O_{1.816}$ | 0 | 0.184 | 0.839 | 0.950 | 700 |

Figure 3:
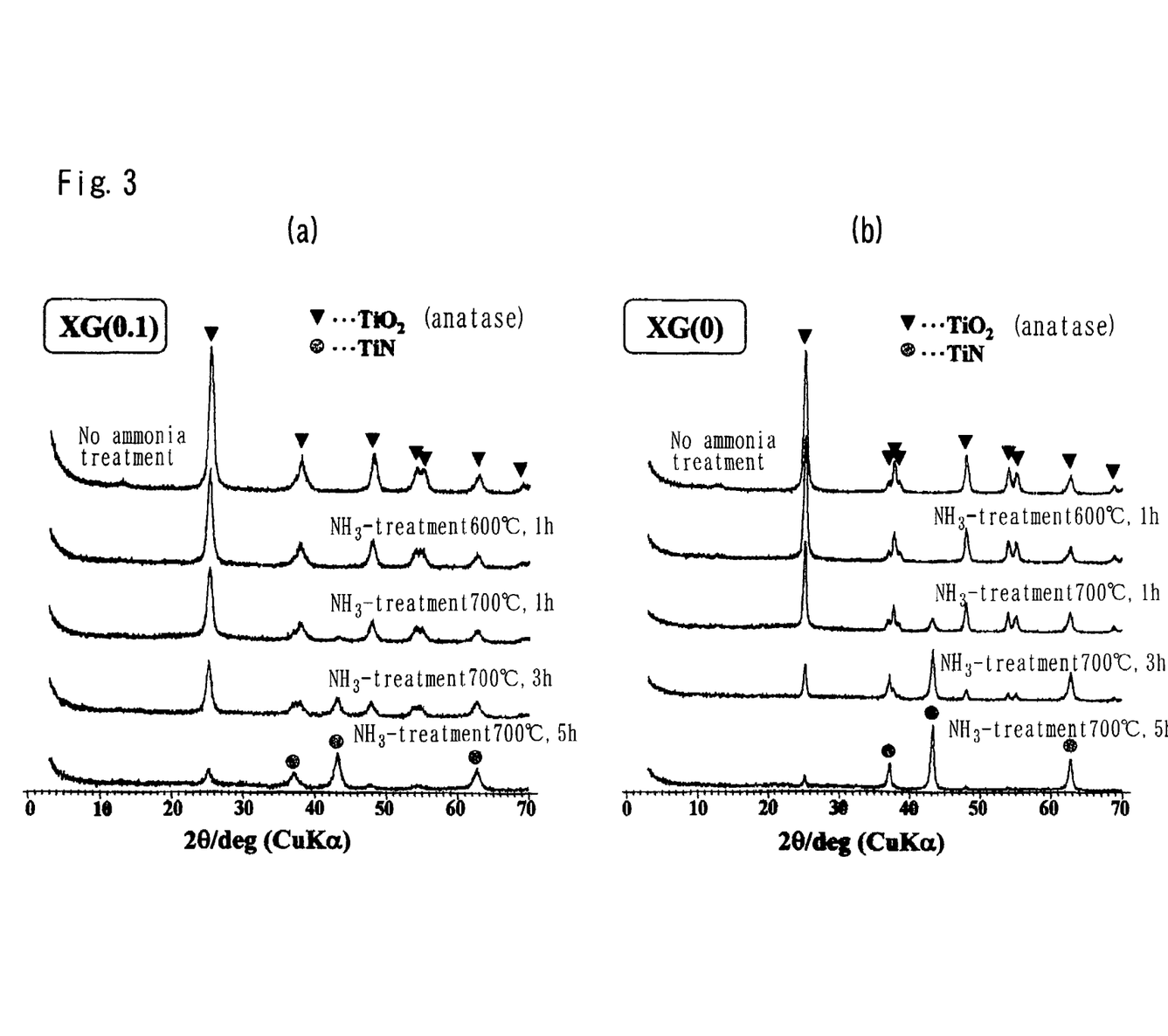
FIG. 3 shows XRD patterns of (a) silica-modified titania XG(0.1) and (b) titania XG(0) after the $NH_3$ treatment.

FIG. 3. shows the XRD patterns of the silica-modified titania, XG(0.1), and titania, XG(0). Before the $NH_3$ treatment, the samples show diffraction peaks corresponding to titania of anatase structure (2theta=25°, 37°, 48°, 54°, 55°, 63°, 69°, measured using CuKα radiation). After the $NH_3$ treatment at 600° C., the samples preserved the anatase structure. However, when the $NH_3$ treatment was carried out at 700° C. for 1 h, three diffraction peaks at 2theta=37°, 43°, 63° were detected. These peaks indicate the formation of TiN phase with a rock-salt structure. In the case of the silca-modified titania, XG(0.1), the peak intensities for the TiN phase were relatively weak than those of XG(0). These peaks became stronger as prolonging the treatment period.

Table 3 shows the composition and the relative absorbance of XG(0.1) treated in the $NH_3$ flow and calcined in air for 30 minutes at 400° C.

Figure 4:
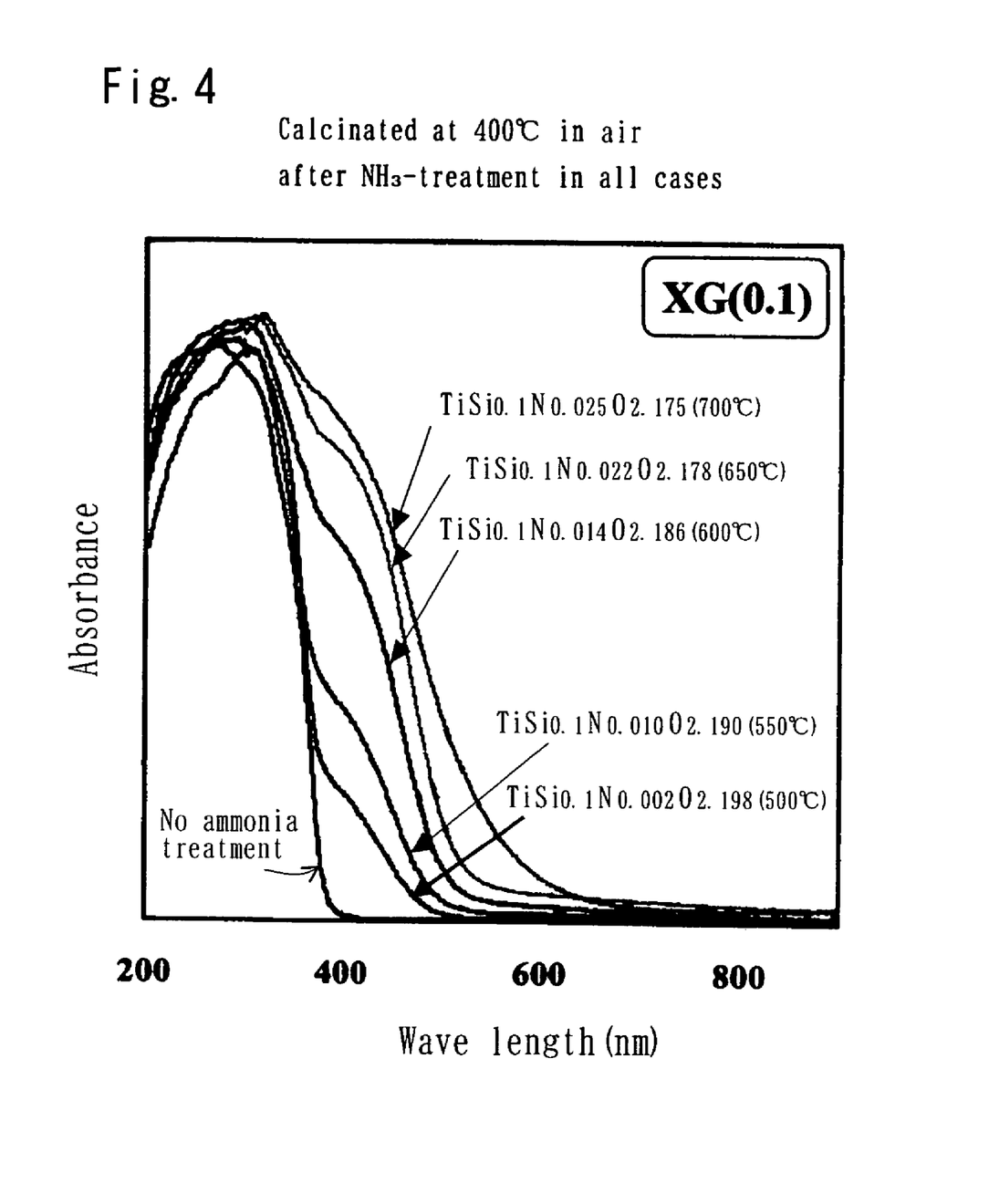
FIG. 4 shows UV-Vis absorption spectra of silica-modified titania XG(0.1) treated in $NH_3$ followed by calcination in air.

As apparently seen in Table 3, the amount of nitrogen-doping was lowered by calcination in air after the $NH_3$ treatment. FIG. 4 shows the UV-Vis absorption spectra of XG(0.1) after the $NH_3$ treatment followed by calcination in air. Compared with the spectra before the calcination in air, FIG. 2(a), the absorption at visible light region decreased significantly. The absorption at higher wavelength (>500 nm) decreased significantly, whereas the absorption at 400–500 nm was preserved. By XRD the TiN phase diminished after the calcination in air.

TABLE 3

The surface composition and optical property of XG(0.1) after the $NH_3$ treatment followed by calcination in air.

| sample | Composition | x | y | Relative Absorbance at 450 nm | Relative Absorbance at 600 nm | $NH_3$ treating temperature (° C.) |
|---|---|---|---|---|---|---|
| XG(0.1) | $TiSi_{0.1}N_{0.002}O_{2.198}$ | 0.1 | 0.002 | 0.102 | 0.004 | 500 |
|  | $TiSi_{0.1}N_{0.010}O_{2.190}$ | 0.1 | 0.010 | 0.202 | 0.013 | 550 |
|  | $TiSi_{0.1}N_{0.014}O_{2.186}$ | 0.1 | 0.014 | 0.407 | 0.027 | 600 |
|  | $TiSi_{0.1}N_{0.022}O_{2.178}$ | 0.1 | 0.022 | 0.581 | 0.048 | 650 |
|  | $TiSi_{0.1}N_{0.025}O_{2.175}$ | 0.1 | 0.025 | 0.662 | 0.076 | 700 |

[Evaluation of Photocatalytic Activities by Measuring the Decomposition of Rhodamine B]

Figure 5:
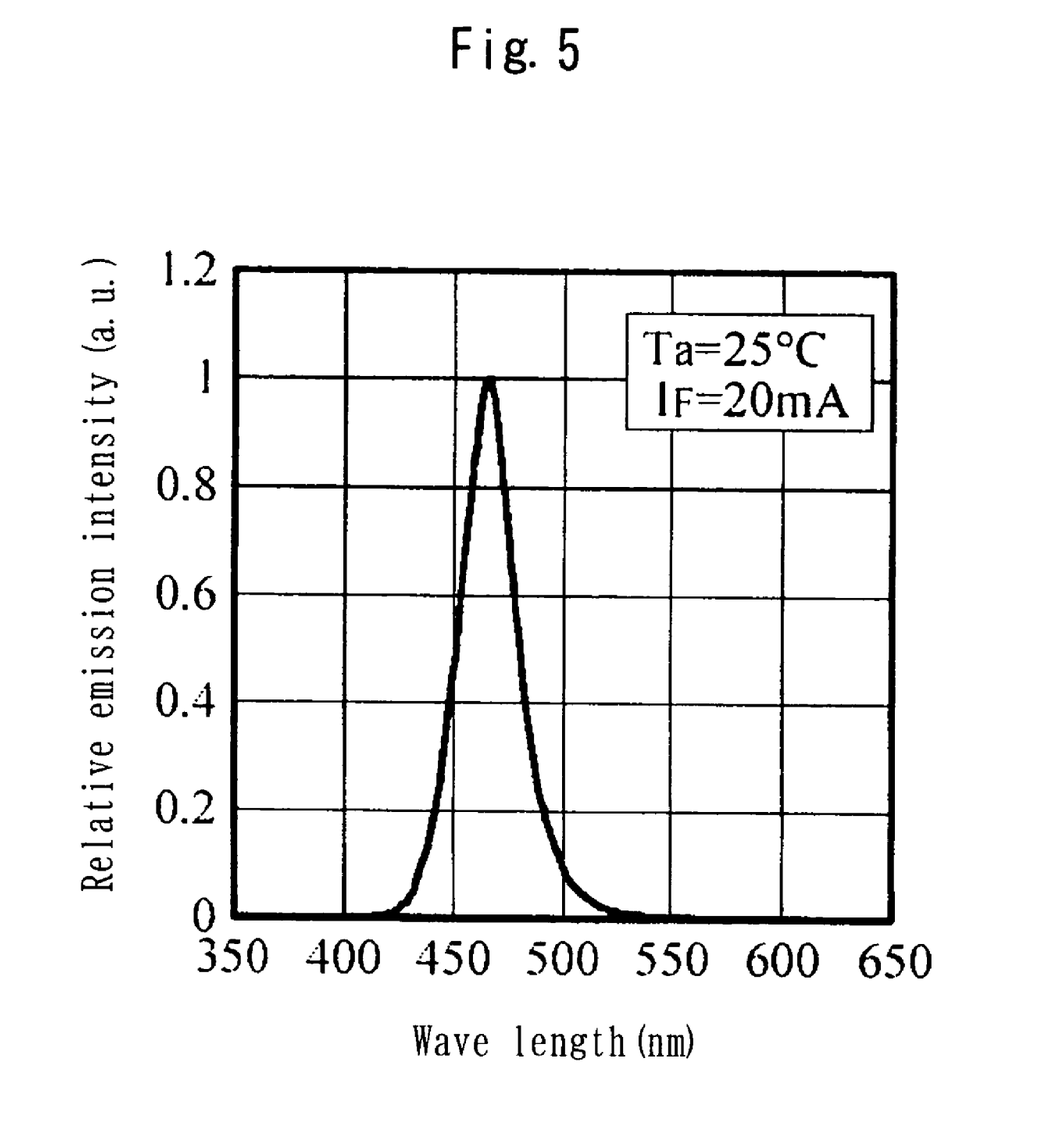
FIG. 5 shows emission spectrum of the blue LED used for the photocatalytic decomposition of RhB.

Photocatalytic activities of the ammonia-treated silica-modified titanias were evaluated by measuring the decomposition rate of an organic dye, Rhodamine B (RhB). Tested catalysts are as follows; XG(0), XG(0.1), and XG(0.2) after the $NH_3$ treatment at 600° C., and XG(0.1), XG(0.2), GT(0.1), and GT(0.2) treated in $NH_3$ at 600° C. followed by calcination in air at 400° C. The catalyst (20 mg) was dispersed in 100 mL of $1.0 \times 10^{-5}$ mol/L RhB. This suspension was irradiated using blue LEDs (Nichia Kagaku Co., Ltd., NSPB510S) under magnetic stirring at room temperature. The emission spectrum of the blue LED is shown in FIG. 5.

Figure 6:
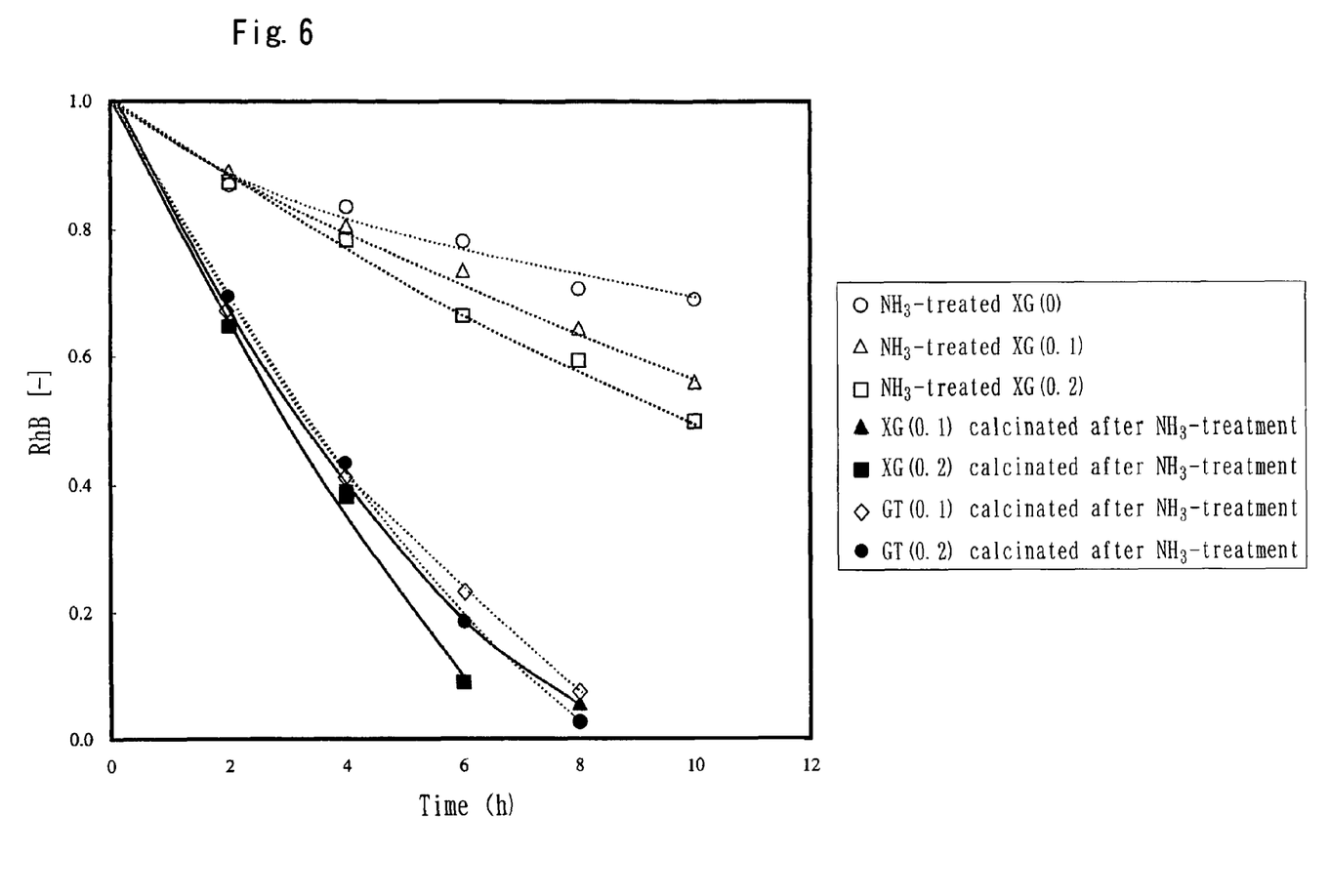
FIG. 6 shows photocatalytic decomposition of RhB under visible light irradiation using nitrogen-doped silica-modified titanias.

After a certain period of irradiation, a portion of the suspension was taken and filtered to measure the absorbance of the RhB solution. The concentration of the remained RhB was determined from the absorbance at 554 nm. The results of the photocatalytic decomposition of RhB as the function of the irradiation time are shown in FIG. 6. Compared with the titania without silica-modification, XG(0), the nitrogen-doped silica-modified titanias, XG(0.1), XG(0.2), GT(0.1) and GT(0.2) exhibited higher photocatalytic activities.

[Evaluation of Photocatalytic Activities by Measuring the Decomposition of Acetaldehyde]

Decomposition of acetaldehyde was carried out in a sealed glass vessel. A portion of the catalyst (0.2 g) dispersed on a glass filter was placed in a closed glass vessel (1 L) and 0.2 mmol of acetaldehyde was injected into the vessel. After the sample was kept in the dark for 1 h, it was irradiated using a 300 W xenon light (Optical Modulex SX-UI300XQ, Ushio Inc.) through a UV cut-off filter (L-42, Asahi Technoglass Co. Ltd.) and an infrared cut-off filter (Super Cold Filter, Ushio Inc.). After a certain period of irradiation time, a small portion of the gas inside the vessel was taken to measure the $CO_2$ generated using a gas chromatography (Shimadzu GC-8A).

Figure 7:
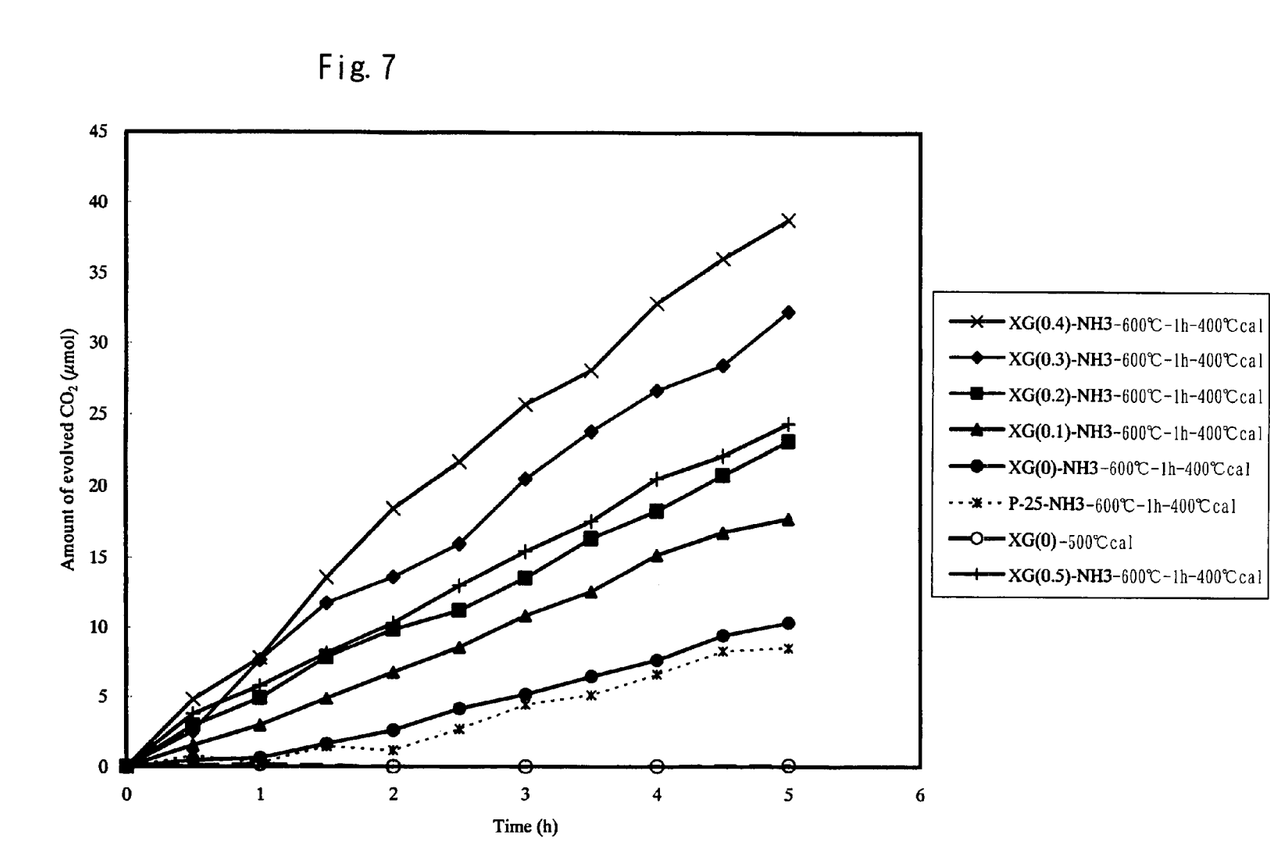
FIG. 7 shows photocatalytic decomposition of acetaldehyde under visible light irradiation using nitrogen-doped silica-modified titanias.

The results of the photocatalytic decomposition of acetaldehyde are shown in FIG. 7. A commercially available titania (P-25) and XG(0) without the $NH_3$ treatment showed no photocatalytic activities under visible light irradiation. Using the nitrogen-doped XG(0), equivalent to a conventional catalyst, about 8 µm of $CO_2$ formation was observed after 5 hour of the irradiation time. On the contrary, the nitrogen-doped silica-modified titanias XG(x)s produced 16–40 µm of $CO_2$, indicating these catalysts have 2–5 times higher photocatalytic activities than the nitrogen-doped titania photocatalyst without silica-modification.

[Characterizations of the Silica-Modified Titanias]

Table 4 shows the surface compositions of the nitrogen-doped silica-modified titanias measured by XPS.

TABLE 4

Surface composition of the nitrogen-doped silica-modified titanias after the NH₃ treatment at 600° C. for 1 h, followed by calcination at 400 ° C. for 30 min.

| Si/Ti (charged) | 0 | 0.02 | 0.06 | 0.1 | 0.2 | 0.3 | 0.4 | 0.5 | 1 |
|---|---|---|---|---|---|---|---|---|---|
| O/Ti[a] | 2.323 | 2.415 | 2.560 | 2.759 | 3.194 | 3.424 | 4.137 | 5.044 | 30.043 |
| N/Ti[a] | 0.005 | 0.008 | 0.013 | 0.014 | 0.025 | 0.022 | 0.021 | 0.026 | 0.027 |
| Si/Ti[a] | — | 0.056 | 0.127 | 0.187 | 0.397 | 0.472 | 0.734 | 1.167 | 11.287 |

[a]Measured by XPS.

TABLE 5

Physical properties of the silica-modified titanias.

| Sample (Si/Ti charged ratio) | BET surface area (m²/g) | Crystallite size[a] (nm) | Bulk density[b] (g/cm³) |
|---|---|---|---|
| XG(0) | 80 | 18 | 0.123 |
| XG(0.02) | 112 | 15 | 0.171 |
| XG(0.1) | 151 | 11 | 0.200 |
| XG(0.2) | 190 | 10 | |

[a]XRD
[b]Mercury porosimetry

Table 5 shows physical properties of the silica-modified titanias. As increasing the amount of the silica-modification, the BET surface area increased and the crystallite size decreased. When the amount of silica was excessively high, the photocatalytic activity was quite low. The reason for this is that the excess silica tends to coat the titania surface. The Si/Ti ratio, therefore, is preferred not to be higher than 1.

Figure 8:
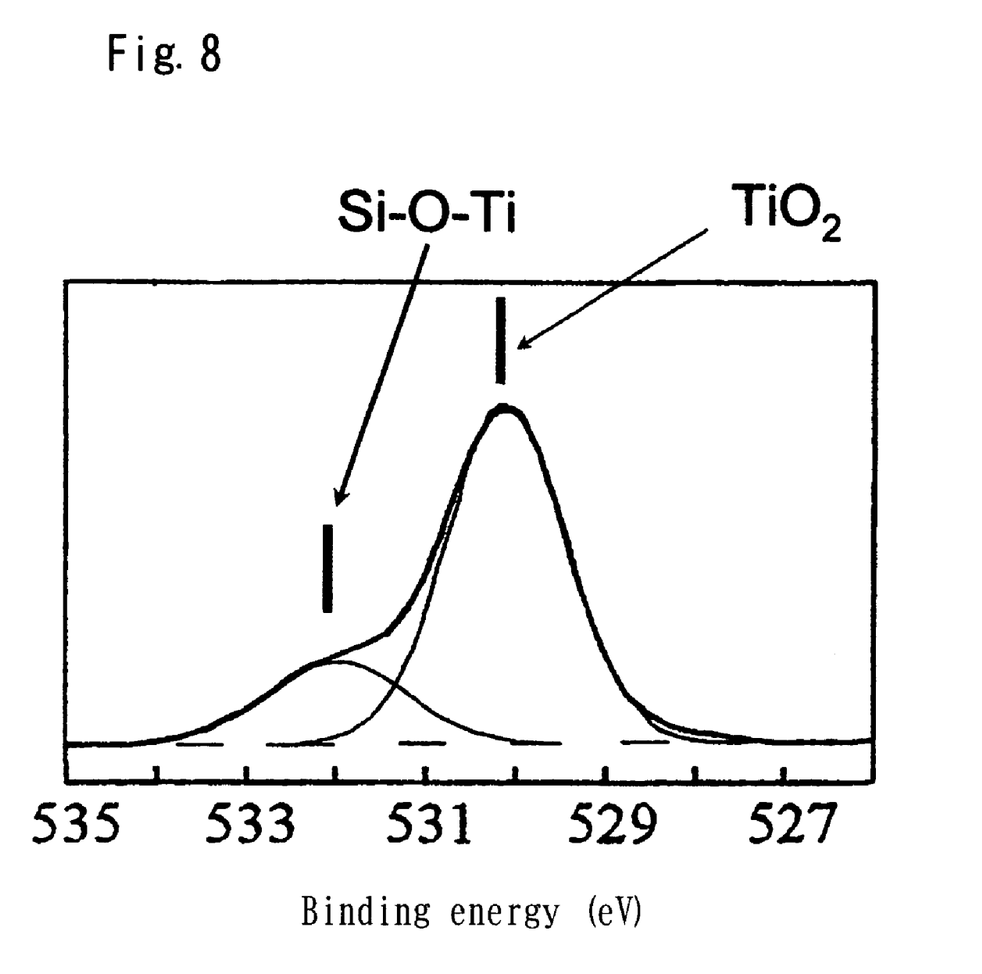
FIG. 8 shows $0_{1s}$ XPS spectra of the silica-modified titanias.

FIG. 8 shows O1s XPS spectra of XG(0.1) before the NH₃ treatment. Two components are recognized at 532 eV and 530 eV, indicating at least two types of oxygen are present in the sample. The component at 530 eV is attributed to the oxygen in titania of anatase structure and the other one at 532 eV is to the oxygen concerning to the Si—O—Ti bond.

Figure 9:
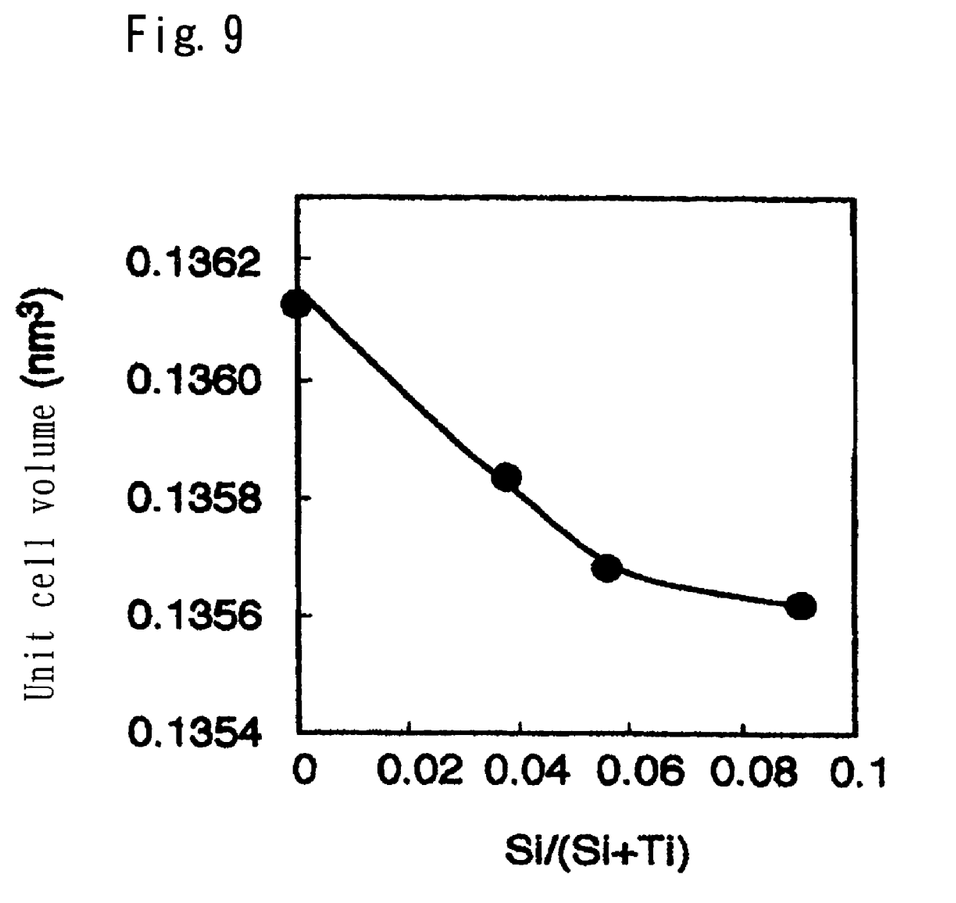
FIG. 9 shows unit cell volume of the silica-modified titanias.

The relationship between the ratio Si/(Si+Ti) and the unit cell volume of the silica-modified titania is shown in FIG. 9. As increasing the Si/(Si+Ti), the unit cell parameter decreased, indicating the formation of silica-titania solid solution.

What is claimed is:

1. An ultraviolet and visible-light-sensitive titania-based photocatalyst, which is expressed by a general formula: $TiSi_xN_yO_{2+2x-y}$, (where $0.01<x<1$ and $0.003<y<0.3$), has a relative absorbance at 450 nm compared with that of 300 nm not lower than 0.1, and has a relative absorbance at 600 nm compared with that of 300 nm not higher than 0.1.

2. An ultraviolet and visible-light sensitive titania-based photocatalyst according to claim 1 which has a relative absorbance at 450 nm compared with that of 300 nm not lower than 0.2, and has a relative absorbance at 600 nm compared with that of 300 nm not higher than 0.05.

3. An ultraviolet and visible-light-sensitive titania-based photocatalyst according to claim 1 which has following composition as expressed in a general formula: $TiSi_xN_yO_{2+2x-y}$, $0.03 \leq x \leq 0.3$ and $0.005 \leq y \leq 0.03$.

4. A preparation method of an ultraviolet and visible-light-sensitive titania-based photocatalyst, whose preparation method is characterized in that silica-modified titanias, in which Si atoms are incorporated in the crystal structure of titania, are heated in ammonia atmosphere preferably at a temperature ranging from 450 to 700° C., and then heated in an oxidative atmosphere preferably at a temperature ranging from 300 to 600° C.

* * * * *